(12) United States Patent
Garrec et al.

(10) Patent No.: US 10,197,137 B2
(45) Date of Patent: Feb. 5, 2019

(54) MISALIGNMENT-TOLERANT CABLE ACTUATOR

(71) Applicant: COMMISSARIAT A L'ENERGIE ATOMIQUE ET AUX ENERGIES ALTERNATIVES, Paris (FR)

(72) Inventors: Philippe Garrec, Gif-sur-Yvette (FR); Fares Kfoury, Clamart (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 90 days.

(21) Appl. No.: 14/759,242

(22) PCT Filed: Feb. 19, 2014

(86) PCT No.: PCT/EP2014/053258
§ 371 (c)(1),
(2) Date: Jul. 6, 2015

(87) PCT Pub. No.: WO2014/128178
PCT Pub. Date: Aug. 28, 2014

(65) Prior Publication Data
US 2015/0345600 A1    Dec. 3, 2015

(30) Foreign Application Priority Data

Feb. 22, 2013  (FR) ...................... 13 51581

(51) Int. Cl.
*F16H 25/20*      (2006.01)
*F16H 19/00*      (2006.01)
(Continued)

(52) U.S. Cl.
CPC ........... *F16H 25/20* (2013.01); *F16H 19/005* (2013.01); *F16H 19/06* (2013.01); *F16H 25/24* (2013.01);
(Continued)

(58) Field of Classification Search
CPC ...... F16H 19/003; F16H 19/005; F16H 19/06; F16H 2019/0681; F16H 25/20;
(Continued)

(56) References Cited

U.S. PATENT DOCUMENTS 4,547,119 A * 10/1985 Chance .................... B25J 9/045
                                                    414/690
5,134,731 A *  8/1992 Quintile ............... A47C 19/045
                                                    192/141

(Continued)

FOREIGN PATENT DOCUMENTS

FR     2 809 464 A1   11/2001
JP     2007-308085 A  11/2007

OTHER PUBLICATIONS

International Search Report of PCT/EP2014/053258 dated May 6, 2014.

*Primary Examiner* — Victor L MacArthur
*Assistant Examiner* — Joseph Brown
(74) *Attorney, Agent, or Firm* — Sughrue Mion, PLLC

(57) ABSTRACT

A cable actuator comprising a chassis (1), a screw (2) mounted rotatably on the chassis and driven by an electric motor, a nut (4) engaging with the screw and associated with anti-rotation means such that a rotation of the screw, under the action of the motor, results in an axial movement of the nut, and two substantially parallel cables (10) coupled to the nut on either side of same. The cables are linked to an anchoring member (20; 30; 40) that is interposed between the nut and the cables, the anchoring member being secured to the nut while also being movable relative to same.

12 Claims, 4 Drawing Sheets

(51) Int. Cl.
*F16H 25/24* (2006.01)
*F16H 19/06* (2006.01)

(52) U.S. Cl.
CPC ..... *F16H 19/0672* (2013.01); *Y10T 74/18608* (2015.01)

(58) Field of Classification Search
CPC ..... F16H 2025/2075; F16H 2025/2096; F16H 2025/2046; F16H 2025/2445; B25J 9/104; B25J 9/1045; B25J 9/12; B25J 9/123; B25J 9/126
USPC ........... 74/89.23, 89.27, 89.28, 89.32, 89.33; 901/21
See application file for complete search history.

(56) References Cited

U.S. PATENT DOCUMENTS

| | | | |
|---|---|---|---|
| 5,392,662 A * | 2/1995 | Jadrich | F16H 25/24 267/160 |
| 5,802,639 A | 9/1998 | Raasch et al. | |
| 7,073,406 B2 * | 7/2006 | Garrec | F16H 25/20 74/89.34 |
| 8,459,139 B2 * | 6/2013 | Lee | B25J 9/1045 74/490.05 |
| 8,950,285 B2 * | 2/2015 | Sim | B25J 9/1025 74/490.01 |
| 2002/0108816 A1 | 8/2002 | Taniguchi | |
| 2011/0056321 A1 | 3/2011 | Sim et al. | |
| 2011/0167945 A1 * | 7/2011 | Yang | B25J 9/104 74/490.04 |

* cited by examiner

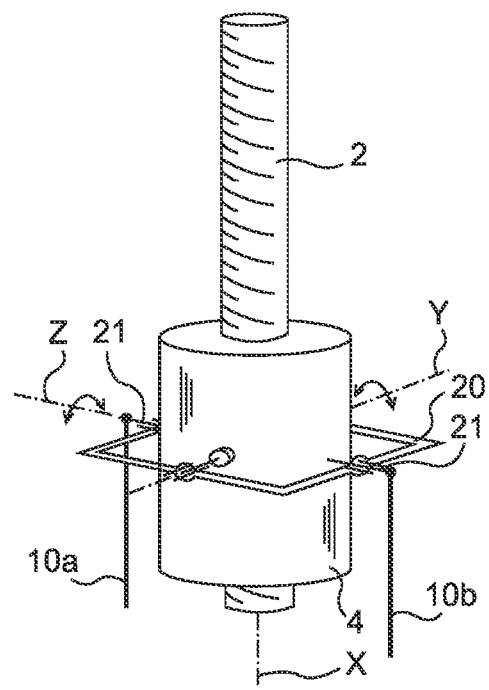
Fig. 3
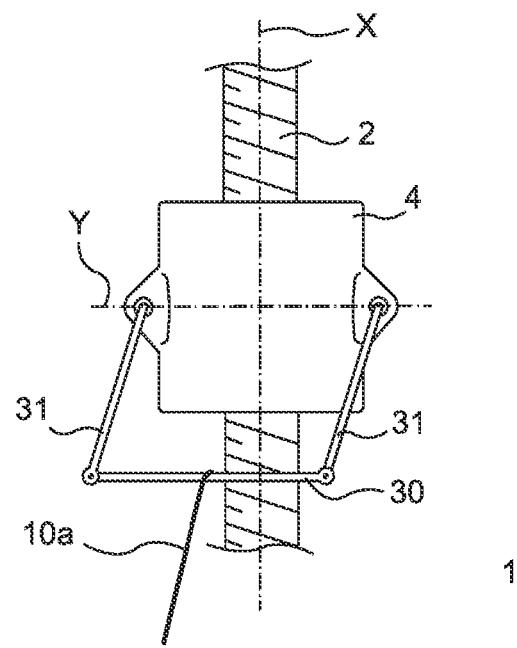 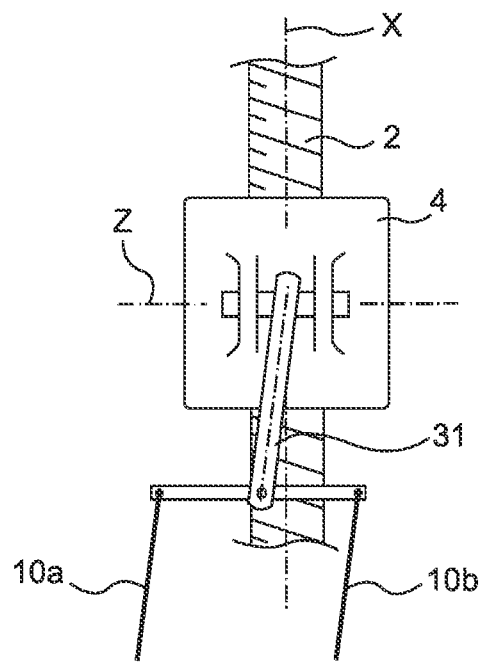
Fig. 4A  Fig. 4B

MISALIGNMENT-TOLERANT CABLE ACTUATOR

The invention relates to a cable actuator comprising a screw/nut assembly, the nut of which is mobile in translation, and is coupled to a pair of cables.

BACKGROUND OF THE INVENTION

Cable actuators are known comprising a screw/nut assembly, the screw of which is rotated by an electric motor, and the nut of which is mobile in translation. The mobile element is coupled to one or more cables, in order to exert traction on the cables.

A cable actuator of this type is known from document FR2809464, wherein the element in translation is the screw, whereas the nut is mobile in translation under the action of a motor. The cable passes into a bore in the screw, and is coupled by means of a tolerant fastener to the misalignments of the cable.

In certain applications, in particular in robotic applications, the size of the actuator is highly critical, and it is important to ensure that this size is as small as possible.

Cable actuators are known comprising a screw which is fitted such as to rotate, and is driven by an electric motor, with a nut cooperating with the screw and being associated with anti-rotation means, such that rotation of the screw under the action of the motor gives rise to axial displacement of the nut, and two parallel cables which are coupled to the nut on both sides of it.

For the same course, this device makes it possible to reduce the size of the cable actuator. In fact, in the known cable actuators, in which the cable(s) is/are coupled to the screw which is displaced, the screw is designed to extend from both sides of the actuator. Thus, the general size would be at least 2C+L, where C is the course of the actuator, and L is the size of the nut. In the actuator according to the invention, this minimum size is now only C+L.

OBJECT OF THE INVENTION

The object of the invention is to propose a cable actuator of the aforementioned type, which is tolerant to the various displacements and deformations which can interfere with its operation.

SUMMARY OF THE INVENTION

In order to achieve this objective, according to the invention a cable actuator is proposed comprising a screw which is fitted such as to rotate and is driven by an electric motor, with a nut cooperating with the screw and being associated with anti-rotation means, such that rotation of the screw under the action of the motor gives rise to axial displacement of the nut, and two parallel cables which are coupled to the nut on both sides of it, wherein, according to the invention, the cables are connected to an anchorage unit which is interposed between the cables and the nut, the anchorage unit being coupled to the nut, so as to permit relative movement between the nut and the anchorage unit. Thus, any misalignments of the cables are absorbed by movement of the anchorage unit, without subjecting the nut to stress.

BRIEF DESCRIPTION OF THE DRAWINGS

The invention will be better understood by reading the following description of various embodiments of it, provided with reference to the figures of the accompanying drawings, among which:

FIGS. 2A and 2B are operating diagrams of the cable actuator in FIG. 1, the nut being shown in the two end axial positions;

FIG. 3 is a partial view in perspective of an actuator according to a particular embodiment, the nut of which is equipped with a pivoting anchorage unit;

FIGS. 4A and 4B are lateral views according to two perpendicular orientations, illustrating an actuator with an anchorage unit according to another particular embodiment, illustrating two situations of misalignment of the cables;

DETAILED DESCRIPTION OF THE INVENTION

Figure 1:
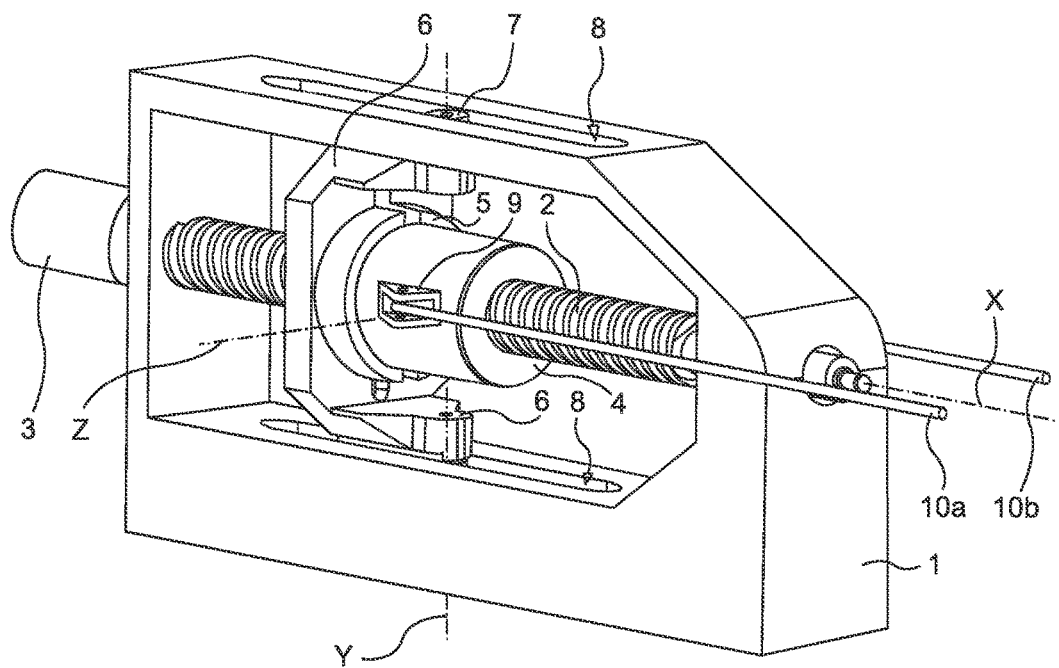
FIG. 1 is a partial view in perspective of a cable actuator according to a particular embodiment of the invention.

With reference to FIG. 1, the cable actuator according to the invention comprises a chassis 1 on which a screw 2 is fitted so as to turn according to an axis X, whilst being rotated, in this case by an electric motor 3. A nut 4 cooperates with the screw 2, and is associated with an anti-rotation device 5 comprising two arms 6 which extend on both sides of the nut 4, in order to support rollers 7 (only one can be seen in this case), which are fitted so as to turn according to an axis Y at right-angles to the axis X. The rollers 7 are engaged in longitudinal slots 8 which are provided in the chassis, and extend parallel to the axis X. The axis Y passes substantially into the center of the nut 4. Thus, the nut is displaced axially under the effect of the rotation of the screw, without turning around the axis X. However, angular deviations are permitted around the axis Y, but also around an axis Z which is at right-angles to the axes X and Y.

The nut 4 comprises means 9 for coupling of two cables 10a, 10b which extend on both sides of the nut 4, parallel to the axis X. In this case, the coupling means comprise two double flanges (only one can be seen in this case) which extend on both sides of the nut 4.

Figure 2B:
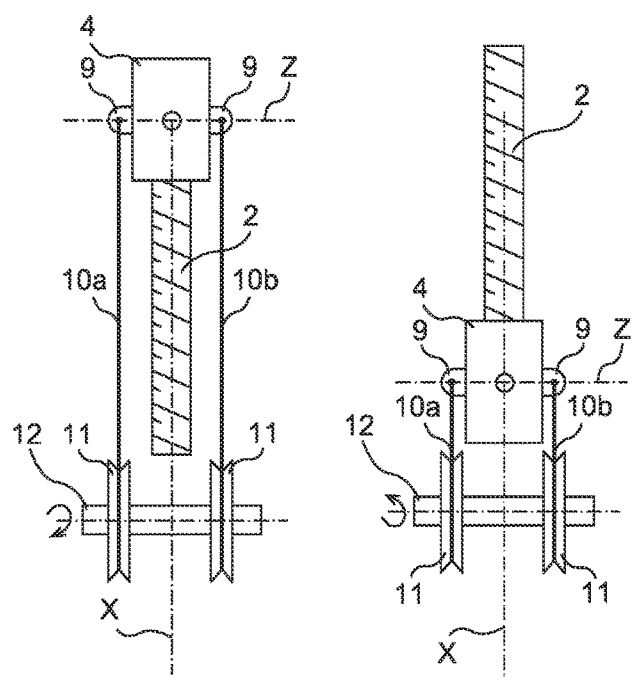

As illustrated in FIGS. 2A and 2B, the cables 10a and 10b are each wound around a pulley 11, the two pulleys 11 being integral with the same shaft 12 which is fitted such as to rotate according to an axis parallel to the axis Z. The shaft 12 is thus rotated once traction is exerted on the cables by displacement of the nut 4. In a manner known per se, the cables 10a and 10b are kept taut, for example by placing the cables in a loop between two pulleys (as in document FR2809464), or, if only a one-way action is required, by means of a tension spring.

Various causes can introduce disturbances which give rise to dissymmetry in the traction of the two cables 10. In particular, the shaft 12 may not turn around an axis which is perfectly parallel to the axis Z, and can be subjected to axial or transverse offsettings. Similarly, it is known that if a ball screw or roller screw is used, the nut is liable to oscillate around a transverse axis, which is or is not included on the plane defined by the pair of cables (in particular, if the actuator is equipped with an anti-rotation device, such as the one shown in FIG. 1, the nut will oscillate around the axis Y), which will naturally induce dissymmetries in the traction of the cables 10a, 10b.

In order to absorb these disturbances, and according to the invention, the nut 4 is equipped with an anchorage unit to which the cables are coupled directly, the anchorage unit being integral with the nut whilst being mobile relative to the latter, in order to absorb these disturbances, and ensure homogeneous traction of the two cables.

According to a particular embodiment illustrated in FIG. 3, in this case the anchorage unit comprises a frame 20 which is fitted so as to pivot on the nut 4 according to the axis Y. The frame 20 comprises pivots 21 which are fitted so as to pivot on the frame around the axis Z (when the frame is straight as shown here). The cables 10a and 10b are coupled directly to the pivots 21. Thus, the nut is free to oscillate around the axis Y without however giving rise to imbalance in the traction of the cables 10a, 10b.

As a variant, it would be possible to couple the cables directly on the frame 20, with the natural flexibility of the cables absorbing any rotation around the axis Z.

According to another particular embodiment illustrated in FIGS. 4A and 4B, the nut is once more associated with a frame 30 to which the cables 10a and 10b are coupled. However, the frame 30 is no longer fitted so as to pivot on the nut 4, but is suspended on the nut by means of two rigid connecting rods 31 with ball ends. The connecting rods 31 extend on both sides of the nut 4, the connecting rods preferably being coupled to the latter at coupling points which are symmetrical relative to the axis X (and are on the axis Y in FIG. 4a). The cables 10a and 10b are coupled directly to the frame 30 at two symmetrical points (according to the axis Z in FIG. 4B). The two figures show how a frame 30 of this type makes it possible to absorb offsetting according to the axis Y of the axis of rotation of the shaft 12 (FIG. 4A), and offsetting of this same axis of rotation according to the axis Z (FIG. 4B). Angular offsetting of the said axis of rotation around the axis X or around the axis Y would be absorbed in the same manner by the mobility of the frame 31.

Figure 5A:
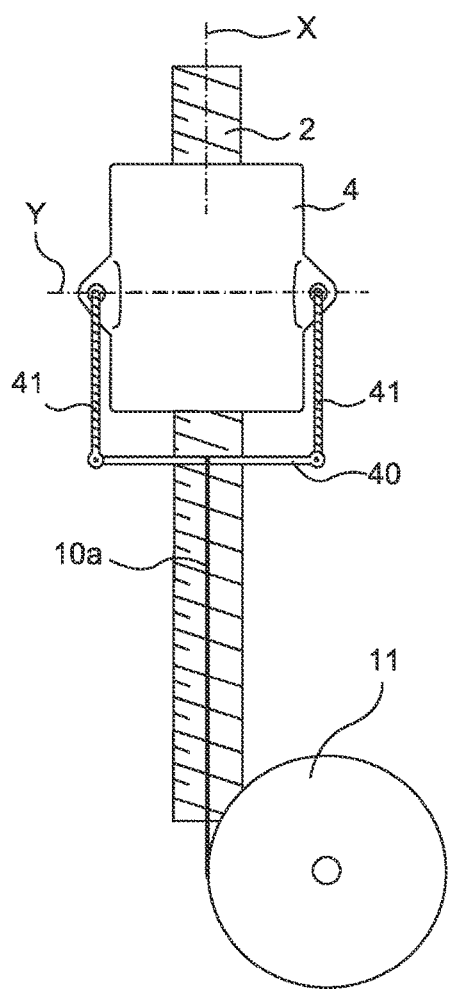
FIGS. 5A and 5B are lateral views according to two perpendicular orientations, illustrating an actuator with an anchorage unit according to another particular embodiment, illustrating two situations of misalignment of the cables.
Figure 5B:
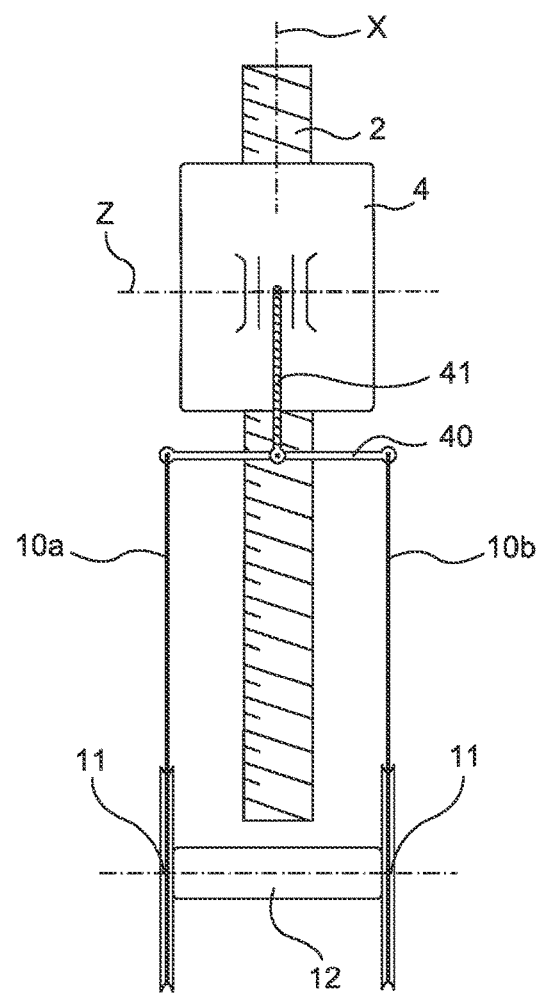

According to yet another embodiment illustrated in FIGS. 5A and 5B, the frame 40 is now suspended on the nut by means of two naturally flexible portions of cable 41.

These portions of cable 41 can be connected simply to the nut and to the frame, without a ball connection. For example, their ends can be secured directly on the nut and on the frame, or form a loop around a spindle.

Figure 6:
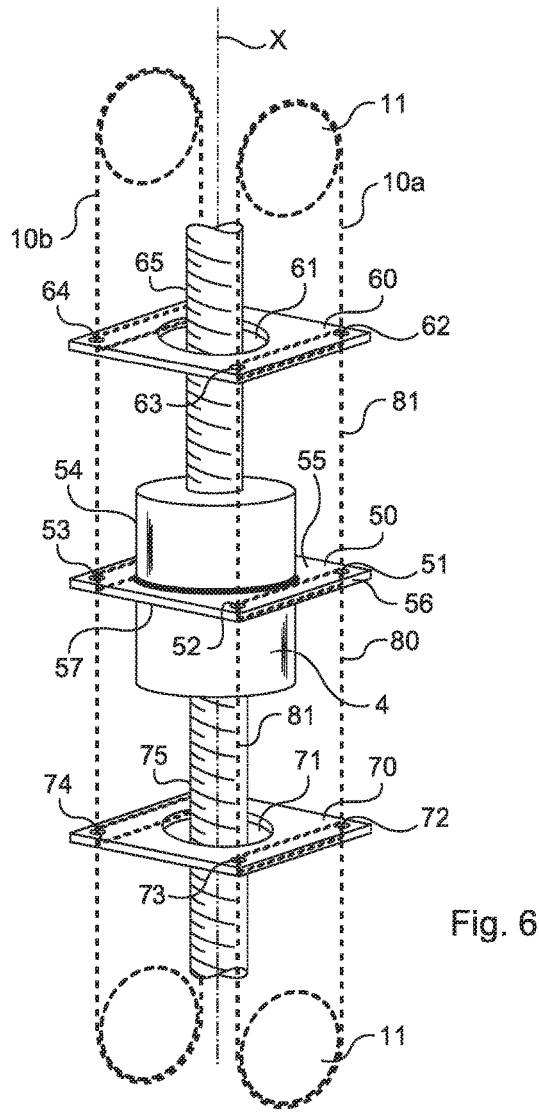
FIG. 6 is a schematic representation in perspective of another particular embodiment of a cable actuator according to the invention.
Figure 7:
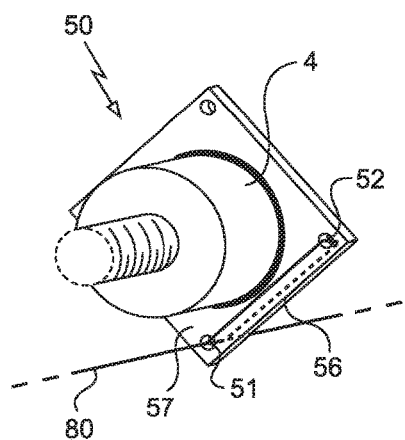
FIG. 7 is a detailed view in perspective of a detail of the embodiment in FIG. 6.

In the embodiment represented in FIG. 6, the nut 4 is connected rigidly (in this case by welding) to a frame 50 with a square form comprising bores with references 51 to 54 at each of its corners. Two square frames 60 and 70 each comprising a central orifice 61, 71 for passage of the screw 2 extending on both sides of the frame 50. At each of their corners, the frames 60 and 70 comprise respective bores with the references 62 to 65 and 72 to 75. The cable 10a and the counterpart cable 10b are wound around pulleys 11 and extend through bores in the frames 50, 60 and 70. As shown in detail in FIG. 7, a first strand 80 of the cable 10a passes through the bore 51, extends on the first face 55 of the frame 50 whilst running along the edge 56, then passes through the bore 52, and extends on the second face 57 of the frame 50 whilst running along the edge 56, then passes once more through the bore 51. The first strand 80 of the cable 10a then carries out a dead turn on the frame 50 and secures the cable 10a to the nut 104. The first strand 80 of the cable 10a extends as far as the frame 60, and carries out a dead turn on the latter through bores 62 and 63, in order to exit through the bore 62, and be wound around the pulley 111. The second strand 81 of the cable 10a extends parallel to the first strand 80 as far as the frame 60, and then carries out a dead turn on the latter through the bores 63 and 62 in order to exit through the bore 63. The second strand 81 then carries out a dead turn on the frame 50 through the bores 52 and 51, in order to exit through the bore 52. The second strand 81 then engages in the bore in the frame 70, and carries out a dead turn on the frame 70 through the bores 73 and 72, in order to exit once more through the bore 73, and be wound around the pulley 11. The second strand 81 is then connected to the first strand 80, and carries out a dead turn on the frame 70 through bores 72 and 73, in order to exit through the bore 73 and join once more the first strand 80 which is engaged through the bore 51 in the frame 50. The counterpart cable 10b follows a similar path through the bores 53, 54 of the frame 50, 64, 65 of the frame 60, 74 and 75 of the frame 70.

The cables 10a and 10b are thus connected to the nut 4 by an anchorage unit comprising the frames 60 and 70 and the cable strands 80, 81. The frames 60 and 70 are suspended on the nut 4 by the cable strands 80 and 81 (which play the same part as the connecting rods 31 and the portions of cable 41 of the embodiments previously described) whilst being mobile relative to the nut.

The blocking of the cables by means of dead turns is particularly useful when using cables made of synthetic material, in particular polyaramide strings, the crimping of which on the nut 104 is difficult to carry out. It will be appreciated that the use of dead turns in order to render the cables 10a and 10b integral with the nut (via the frame 50) as well as with the anchorage units (in this case the frames 60 and 70) is not limited to single dead turns, and the blocking effect can be reinforced by carrying out a plurality of dead turns by passing the cable several times through the same pair of bores.

Figure 8:
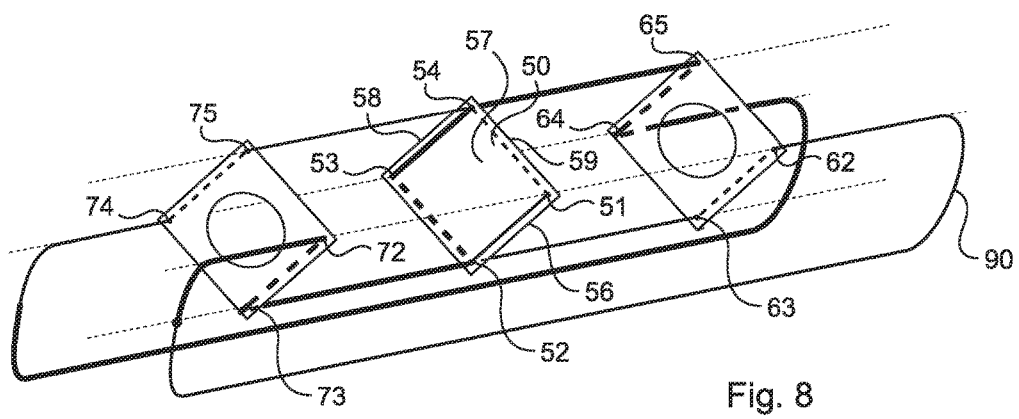
FIG. 8 is a schematic representation in perspective of another particular embodiment of a cable actuator according to the invention.

According to another particular embodiment represented in FIG. 8, the transmission by the cables 10a and 10b is carried out by means of a single cable loop 90, the two strands of which, which form the cables 10a and 10b, are represented in lines with different thicknesses in order to facilitate understanding. This effect is obtained by modifying the embodiment of the dead turns on the frame 50. The first strand 91 of the cable 90 (corresponding to the first strand 80 of the embodiment in FIG. 6) is engaged through the bore 52 in the frame 50, and extends on the first face 55 of the frame 50, whilst running along an edge adjacent to the edge 56, it then passes through the bore 53 and extends on the second face 57 of the frame 50, whilst running along an edge 58 of the frame 50 parallel to the edge 56, then passes through the bore 54, before being engaged through the bore 65 in the frame 60. The strand 91 then extends between the bore 65 and the bore 64, exits once more via the bore 64, and passes above the edge of the frame 60 in order to be wound around the pulley 11 and join once more the pulley 11 facing it, without being engaged in any of the frames 50, 60, 70. The strand 91 then engages in the bore 74 in the frame 70, in order to exit once more via the bore 75, pass above the edge of the frame 70, and extend as far as the bore 54 in the frame 50. The strand 91 then engages through the bore 54 in the frame 50, extends on the second face 57 of the frame 50 whilst running along an edge adjacent to the edge 58, then passes through the bore 51, and extends on the first face 56 of the frame 50 whilst running along the edge 56 of the frame 50, then passes through the bore 52, before engaging through the bore 63 in the frame 60. The strand 91 then extends between the bore 63 and the bore 62, exits once more via the bore 62, and passes above the edge of the frame 60, in order to be wound around the pulley 11 and join once more the pulley 11 facing it, without being engaged in any of the frames 50, 60, 70. The strand 91 then engages in the bore 72 in the frame 70, in order to exit once more via the bore 73, pass above the edge of the frame 70, and extend as far as the bore 52 in the frame 50.

This embodiment makes it possible to obtain a cable actuator, the variations of length and resilience of which have a uniform effect on the operation of the actuator.

The invention is not limited to the preceding description, but incorporates all variants included in the scope of the invention defined by the claims. In particular, although in this case the anchorage unit is in the form of a frame, the anchorage unit can have any form once it is rendered integral with the nut, whilst being mobile relative to the latter. Any means for coupling the anchorage unit to the nut can be envisaged.

In addition, although, in the examples illustrated, the anchorage unit is coupled to the nut by coupling means which are connected to the anchorage unit at two points which define a first axis transverse to the axis of rotation of the screw, with the cables being coupled to the anchorage unit at a second transverse axis which is perpendicular to the first transverse axis, the two transverse axes need not be perpendicular to one another, but simply oblique.

Finally, if the misalignments of the cables are negligible, it is possible to dispense with an intermediate anchorage unit, and couple the cables directly to the nut.

The invention claimed is:

1. A cable actuator comprising:
   a chassis;
   a screw which is fitted so as to rotate on the chassis and is driven by an electric motor;
   a nut which engages the screw and which engages anti-rotation means, such that rotation of the screw under action of the motor causes axial displacement of the nut;
   two substantially parallel cables, each coupled to the nut on a respective side of the nut;
   wherein the cables are connected to an anchorage unit which is interposed between the nut and the cables, the anchorage unit being integral with the nut whilst being mobile relative to the nut;
   wherein the cables are each wound around a respective pulley, the two pulleys being integral with a same shaft; and
   wherein the anchorage unit is suspended on the nut by two parallel connecting elements which are coupled firstly to the nut on respective sides of the nut, and secondly to the anchorage unit, so that the anchorage unit is movable with respect to the nut along with a movement of the connecting elements so as to absorb offsetting of a rotation axis of the same shaft to which the two pulleys are integral; and
   wherein each connecting element is pivotally coupled at one end to the nut and at the other end to the anchorage unit.

2. The cable actuator as claimed in claim 1, wherein the anchorage unit is fitted so as to pivot on the nut around a transverse axis perpendicular to an axis of rotation of the screw.

3. The cable actuator as claimed in claim 2, wherein the cables are coupled to the anchorage unit whilst being attached to pivots fitted so as to turn on the anchorage unit according to an axis which is perpendicular to the transverse axis and to the axis of rotation of the screw.

4. The cable actuator as claimed in claim 1, wherein the cables are coupled directly to the anchorage unit.

5. The cable actuator as claimed in claim 1, wherein the two parallel connecting elements are rigid connecting rods.

6. The cable actuator as claimed in claim 1, wherein the two parallel connecting elements are portions of a cable.

7. The cable actuator as claimed in claim 1, wherein the anchorage unit is coupled to the nut by coupling means which are connected to the anchorage unit at two coupling points which define a first transverse axis perpendicular to an axis of rotation of the screw, whereas the cables are coupled on the anchorage unit at two points which define a second transverse axis perpendicular to the axis of rotation of the screw which is perpendicular to the first transverse axis.

8. The cable actuator as claimed in claim 1, wherein the anti-rotation means comprise two rollers which extend on both sides of the nut, and are displaced in longitudinal slots in the chassis.

9. The cable actuator as claimed in claim 1, wherein the nut comprises a frame which is integral with the nut and is provided with bores, the cables being coupled to the nut by means of dead turns through bores in the frame, the anchorage unit being coupled to the nut, so as to permit relative movement between the nut and the anchorage unit.

10. The cable actuator as claimed in claim 9, wherein the anchorage unit comprises two frames which extend on both sides of the frame which is integral with the nut, and in which the cables are engaged, with the cables extending between the frame which is integral with the nut and the two frames of the anchorage unit forming a suspension for the anchorage unit on the nut.

11. A cable actuator comprising:
    a chassis;
    a screw fitted so as to rotate on the chassis and is driven by an electric motor;
    a nut coupled with the screw, such that rotation of the screw axial displaces the nut;
    two substantially parallel cables that are coupled to the nut on both sides of the nut;
    wherein the cables are connected to an anchorage unit that is interposed between the nut and the cables, the anchorage unit being integral with the nut while mobile relative to the nut;
    wherein each cable is wound around a respective one of two pulleys, the two pulleys integral with a common shaft; and
    wherein the anchorage unit is suspended on the nut by two parallel connecting elements that are coupled first to the nut on sides of the nut, and second to the anchorage unit, so that the anchorage unit is movable with respect to the nut along with a movement of the connecting elements so as to absorb offsetting of a rotation axis of the common shaft; and
    wherein each connecting element is pivotally coupled at one end to the nut and at the other end to the anchorage unit.

12. The cable actuator as claimed in claim 11, wherein for each cable, one distal end is connected to the anchorage unit and the other distal end is connected to the respective pulley.

* * * * *